Patented June 1, 1943

2,320,937

UNITED STATES PATENT OFFICE 2,320,937

PROCESS FOR ADHESIVELY UNITING HARD AND SOFT RUBBER OR RUBBERLIKE MASSES WITH SURFACES OF OTHER MATERIALS

Herbert Knoop, Frankfort-on-the-Main, and Hermann Miedel, Bad Homburg von der Hohe, Germany, assignors to American Lurgi Corporation, New York, N. Y., a corporation of New York No Drawing. Application November 25, 1939, Serial No. 306,176. In Germany December 1, 1938

4 Claims. (Cl. 154—2)

The present invention relates to an improved process for adhesively uniting hard and soft rubber and rubber-like masses with surfaces of other materials, such as, metal, glass, synthetic resins, wood, porcelain and the like materials.

It is an object of the invention to provide a process for adhesively uniting rubber and rubber-like masses to other surfaces during the vulcanization of the rubber whereby an extremely firm and vibration-resistant union is obtained.

The problem of uniting rubber with surfaces of hard materials is assuming great importance as new fields are constantly opening for the use of rubber and rubber-like masses adhesively united with surfaces of hard materials, as, for example, in the automobile industry. Higher requirements are constantly being demanded, such as, for example, with respect to the tensile strength of the unions and the ease with which such unions may be achieved.

Many proposals have already been made of processes for uniting soft or hard rubber with hard, smooth surfaces with the aid of an intermediate adhesive layer during vulcanization of the rubber. In accordance with one of such proposals, an intermediate layer containing a phenol formaldehyde resin, rubber and hemoglobin is employed. In accordance with another proposal, an intermediate adhesive layer is employed containing a synthetic resin which hardens upon heating and rubber, this intermediate layer being applied as a mixture wherein the rubber is in solution and the resin being such that the rubber and resin are not soluble in each other. No hemoglobin is to be present in the adhesive layer in accordance with this latter proposal.

It has now been found, in accordance with the present invention, that improved unions between rubber and other surfaces may be achieved when employing an intermediate layer produced from condensation products of urea, thiourea or their homologues with aldehydes, such as, formaldehyde, which harden upon heating and rubber which may contain additional substances, such as, hemoglobin and vulcanization agents. Hereinafter the term "urea" is employed to designate not only urea, but also thiourea and their homologues.

This intermediate layer is prepared by applying the resin component and the rubber component separately to at least one of the surfaces to be joined. The rubber component is applied in the form of an aqueous dispersion. The unions obtained in accordance with the present invention possess especially high tensile strengths.

The process in accordance with the present invention furthermore possesses substantial advantages over the processes of the prior art employing phenol formaldehyde condensation products, such as, for example, resinol E, in the intermediate adhesive layer. The urea aldehyde condensation products employed in accordance with the present invention are almost odorless and do not contain materials which might impair the health of workers. The etching effect of the phenol and cresol containing resinol E has caused many complaints, especially in cases where rubber is to be united with small articles. The traces of phenol and cresol in the product which may remain in the product or which may be split off during the heat treatment have a deleterious effect upon the adhesive layer, especially during the aging thereof. It has also been found that adhesive layers containing phenol formaldehyde condensation products when employed for uniting rubber to objects subject to vibration strains are apt to fail earlier than those containing urea formaldehyde condensation products because of the greater brittleness of the adhesive layers containing phenol formaldehyde condensation products after the heat treatment necessary for the vulcanization of the rubber mass being united.

Furthermore, it has been found that when employing urea formaldehyde condensation products it is not necessary to add acids to the adhesive composition. In accordance with the proposal wherein a phenol formaldehyde condensation product, rubber and hemoglobin-containing adhesive layer was employed, glacial acetic acid was added thereto. The use of glacial acetic acid is very unpleasant to the persons applying the adhesive coatings and also may cause undesirable effects upon the articles upon which the rubber is to be applied, especially when the rubber is to be applied upon metal articles.

It has been found that neutral hardening accelerators may be employed when using urea aldehyde condensation products in the adhesive layer instead of the acids employed for the adhesive layers containing phenol formaldehyde condensation products. For example, iron pigments, such as iron oxides, may be employed as hardening accelerators. Iron oxides have been found not only to act as very good hardening accelerators, but also have been found to cause greater adhesion of the adhesive layer. The iron oxides need not necessarily be added to the adhesive intermediate layer as such, but various iron compounds yielding the oxides may also be employed.

It has been found preferable to apply a coating containing the urea aldehyde resin in combination with a hardening accelerator first upon the surface to be united with the rubber and then after hardening this layer to apply a coating of an aqueous rubber dispersion in combination with hemoglobin and materials normally present therein, such as, vulcanizing accelerators. The adhesive intermediate layer may be formed by dipping the object to which the rubber is to be united in the coating compositions, or by painting or spraying the object therewith.

The following example serves to illustrate the invention, but the invention is in no way limited thereto:

Example

The surfaces of an iron article which are to be united with a rubber mass are first carefully cleaned to remove any oils, fats or the like. A coating of an alcoholic solution of the following composition is applied upon the cleaned surfaces: 50 parts of an alcohol-soluble, urea formaldehyde condensation product which hardens upon heating, 50 parts methanol and 125 parts $Fe_2O_3$. After the coating has been applied, it is allowed to dry for 30 minutes at room temperature. The articles coated in this manner are then heated for 90 minutes to 140° C. in a heated chamber. After cooling, a second coating consisting of 100 parts rubber (in the form of a 75% rubber latex concentrate), 66 parts hemoglobin, 3 parts sulphur, 4 parts zinc oxide, 1 part diphenyl quanidine and 250 parts water is applied in a thin and uniform layer and is then burned in for two hours at 120° C. Immediately thereafter a normal vulcanizable rubber composition is vulcanized thereupon. This vulcanization is best effected in a closed mold under pressure but can also be effected without a mold in steam or in hot air.

Another example of a solution which may be substituted for the first coating solution employed in the above example is as follows:

50 parts urea formaldehyde condensation product, 50 parts ethanol and 100 parts $Fe_3O_4$.

Under some circumstances the spreading power of such coating mixtures may be improved by raising or lowering the amount of the alcohol employed.

While we have described herein our invention with respect to some embodiments thereof, we do not intend to limit ourselves thereby except within the scope of the appended claims.

We claim:

1. A process for adhesively uniting rubber and rubber-like masses with surfaces of other materials, which comprises applying a coating comprising a urea aldehyde condensation product and an iron oxide to the surfaces to be united with the rubber and rubber-like masses and applying thereover a coating comprising an aqueous rubber dispersion and hemoglobin to form an adhesive layer, and then applying a vulcanizable rubber or rubber-like mass thereover and vulcanizing such mass.

2. A process for adhesively uniting rubber and rubber-like masses with surfaces of other materials, which comprises applying a coating consisting of an alcohol solution of an alcohol-soluble urea formaldehyde condensation product which hardens upon heating and an iron oxide to the surface to be united with the rubber and rubber-like masses, drying and heating such coating, then applying a coating comprising an aqueous rubber dispersion and hemoglobin thereover and heating such coating to burn it in, then applying a vulcanizable rubber or rubber-like mass thereover and vulcanizing such mass.

3. A process for adhesively uniting rubber and rubber-like masses with surfaces of metal, which comprises applying a coating consisting of an alcohol solution of an alcohol-soluble urea formaldehyde condensation product which hardens upon heating and an iron oxide to the metal surface to be united with the rubber and rubber-like masses, drying such coating and heating such coating to about 140° C., allowing such coating to cool, then applying a coating essentially comprising an aqueous rubber dispersion and hemoglobin, burning in such coating at about 120° C., applying a vulcanizable rubber or rubber-like mass thereover and vulcanizing such mass.

4. In a process for adhesively uniting rubber and rubber-like masses to surfaces of other materials wherein an adhesive layer is interposed between a vulcanizable rubber or rubber-like mass and the surface to be united therewith and the rubber or rubber-like mass is then vulcanized, the steps comprising separately applying a coating comprising a urea aldehyde condensation product and an iron oxide and a coating comprising an aqueous rubber dispersion and hemoglobin to at least one of the surfaces to be united, interposing the resultant layer between the surfaces to be united and vulcanizing the rubber or rubber-like mass.

HERBERT KNOOP.
HERMANN MIEDEL.